(12) United States Patent
Schoukens et al.

(10) Patent No.: US 7,641,711 B2
(45) Date of Patent: Jan. 5, 2010

(54) METAL VAPOUR CONDENSATION AND LIQUID METAL WITHDRAWAL

(75) Inventors: Albert Francois Simon Schoukens, Randburg (ZA); Thomas Robert Curr, Randburg (ZA); Masud Abdellatif, Randburg (ZA); Rodney Murison Whyte, Randburg (ZA)

(73) Assignee: Mintek, Randburg (ZA)

(*) Notice: Subject to any disclaimer, the term of this patent is extended or adjusted under 35 U.S.C. 154(b) by 157 days.

(21) Appl. No.: 11/795,712

(22) PCT Filed: Jan. 24, 2006

(86) PCT No.: PCT/ZA2006/000011
§ 371 (c)(1),
(2), (4) Date: Aug. 6, 2007

(87) PCT Pub. No.: WO2006/079125
PCT Pub. Date: Jul. 27, 2006

(65) Prior Publication Data
US 2008/0115626 A1 May 22, 2008

(30) Foreign Application Priority Data
Jan. 24, 2005 (ZA) .................................. 05/0649

(51) Int. Cl.
*C22B 61/00* (2006.01)
*C22B 26/22* (2006.01)
*C22B 19/20* (2006.01)
*C22B 26/20* (2006.01)
*C22B 26/10* (2006.01)

(52) U.S. Cl. .............................. 75/414; 75/590; 75/595; 75/607; 75/665; 423/322

(58) Field of Classification Search .................. 75/414, 75/595, 607, 590, 665, 10.36–10.38, 10.28–10.33, 75/961; 423/322
See application file for complete search history.

(56) References Cited

U.S. PATENT DOCUMENTS

| | | | | |
|---|---|---|---|---|
| 2,473,304 A | * | 6/1949 | Robson ........................ | 75/666 |
| 2,494,552 A | * | 1/1950 | Mahler et al. ................ | 266/150 |
| 2,971,833 A | | 2/1961 | Artru et al | |
| 3,761,248 A | | 9/1973 | Avery | |
| 4,042,379 A | | 8/1977 | Harris et al. | |
| 5,258,055 A | * | 11/1993 | Pargeter et al. ................ | 75/665 |

FOREIGN PATENT DOCUMENTS

| | | |
|---|---|---|
| GB | 674 877 | 7/1952 |
| WO | WO 03/048398 | 6/2003 |

* cited by examiner

*Primary Examiner*—George Wyszomierski
*Assistant Examiner*—Tima M McGuthry-Banks
(74) *Attorney, Agent, or Firm*—Fitch, Even, Tabin & Flannery; Norman N. Kunitz

(57) ABSTRACT

Liquid metal is continuously recovered by condensing metal vapour in a sealed system, more or less at atmospheric pressure, and collecting liquid metal in a crucible. The contents of the crucible are agitated and the temperature is controlled to prevent the liquid metal from solidifying. Liquid metal and dross are tapped from the crucible.

7 Claims, 1 Drawing Sheet

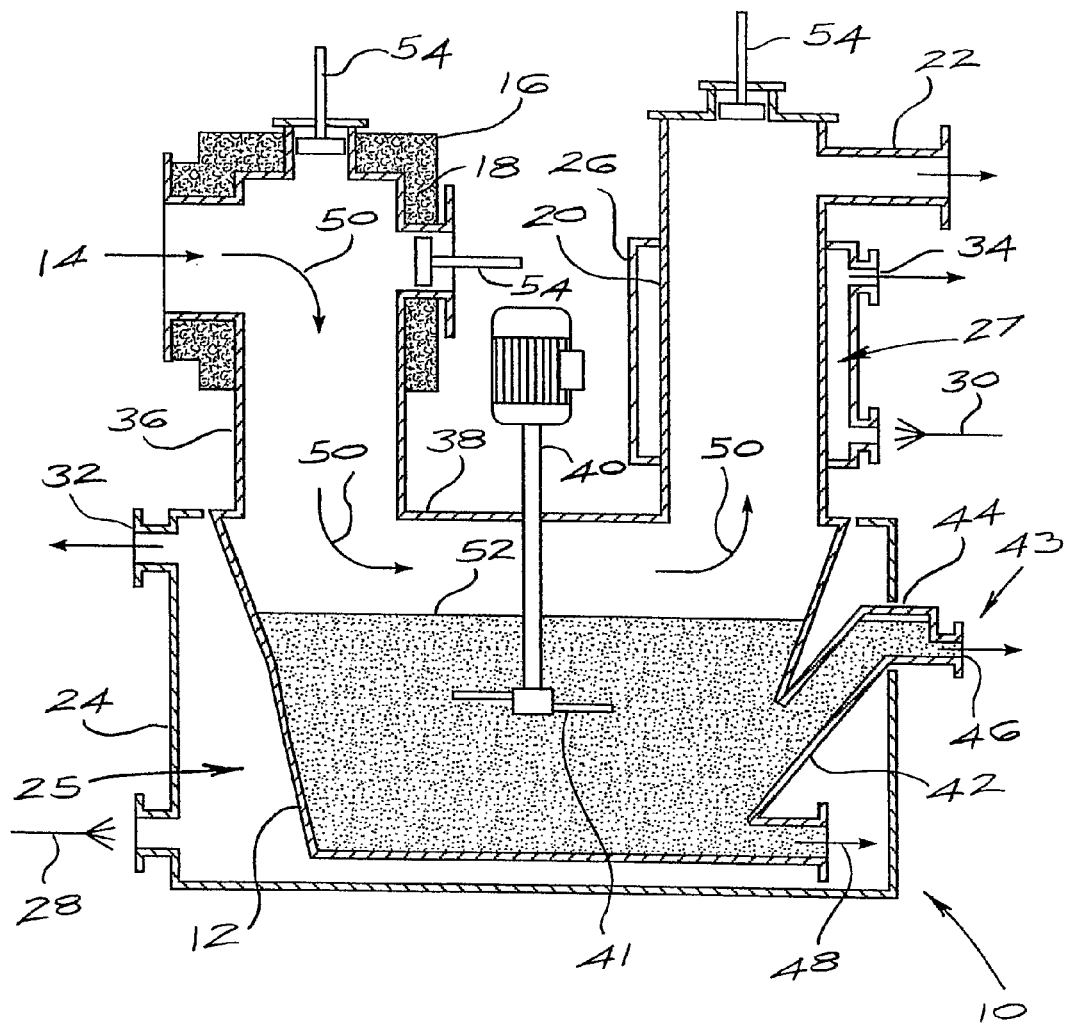

METAL VAPOUR CONDENSATION AND LIQUID METAL WITHDRAWAL

CROSS REFERENCE TO RELATED APPLICATION

This application is the National Stage filing under 35 U.S.C. 371 of International Application No. PCT/ZA2006/000011, filed Jan. 24, 2006, and claims priority of South African Patent Application No. 2005/0649 filed Jan. 24, 2005, the subject matter of which in its entirety, is incorporated herein by reference.

BACKGROUND OF THE INVENTION

This invention relates generally to the condensation of metal vapours, and to the continuous or semi-continuous withdrawal of liquid metal from a condenser.

The invention is described hereinafter with particular reference to the condensation of magnesium vapour, and the withdrawal of liquid magnesium from a condenser. It is to be understood that this is given by way of a non-limiting example and that the principles of the invention can be applied to other volatile metals such as zinc, calcium, sodium, potassium, and phosphorus.

The metallic vapour may be pure or it may be mixed with an inert gas such as argon, and it may contain dross, i.e. solid process contaminants, such as magnesium oxide.

U.S. Pat. No. 2,971,833 entitled "Process of Manufacturing Magnesium" (J. Artru et al) describes what is known as a Magnetherm furnace and condenser for the manufacture of magnesium. The Magnetherm process involves the thermal production of magnesium vapour in a furnace and the condensation of the vapour in a condenser. The vapour is conducted to a condensation zone in the condenser where it is condensed as partly liquid and partly solid magnesium. The process is carried out under a vacuum of 2 kPa to 10 kPa and the condenser crucible is cooled from the outside either by water-spray cooling or by immersion in a tank with circulating water. Since the furnace-condenser system is maintained under vacuum, and because the magnesium in the condenser is mostly solid, the process is essentially a batch process which is repeated every 12 to 24 hours. The vacuum has to be broken to remove the slag periodically from the furnace and to replace the full condenser crucible with an empty one.

The product vapour generated in a thermal magnesium process such as the Magnetherm process inherently contains some undesirable solid particles of magnesium oxide, magnesium nitride, silicon oxide, calcium oxide, aluminium oxide, and carbon. The mixture of these solid particles is called dross. Most of the dross particles accumulate in the condenser crucible. In order to achieve continuous magnesium operation, a means of dross removal from the condenser has to be included in the design and the operating method of the condenser. The magnesium generating furnace may contain an underflow-overflow weir arrangement for continuous withdrawal of slag and residual ferrosilicon which are produced as by-products in the furnace to make the whole process of magnesium generation and condensation continuous.

It is an objective of this invention to provide a method and apparatus for continuous metal condensation and withdrawal of condensed liquid metal by operating at, or close to, atmospheric pressure, by suitable temperature control of the condenser, and by stirring of the condenser contents to allow continuous or semi-continuous withdrawal of metal from a condenser crucible.

SUMMARY OF THE INVENTION

The invention provides a method of condensing metal vapour which includes the steps of:
(a) directing a stream of metal vapour at, or close to, atmospheric pressure into a sealed condenser apparatus which includes a receiving crucible;
(b) controlling the temperature inside the crucible so that the metal vapour condenses, and is kept as liquid metal in the crucible;
(c) agitating the crucible contents of liquid metal and dross in order to pull in dross, metal vapour, and liquid metal droplets, to suspend the dross into the liquid metal, to dissipate energy of condensation and transfer this energy to side-walls of the crucible and into a heat transferring medium and so improve the efficiency of condensation; and
(d) tapping liquid metal and dross from the crucible as a slurry, without interrupting the production and condensation of metal vapour.

The dross may comprise solid particles of mainly metal oxides.

"Slurry", as used herein, designates a suspension or emulsion of dross in liquid metal.

The metal vapour may be the vapour of a volatile metal such as magnesium, zinc, calcium, sodium, potassium, and phosphorus. In the case of magnesium, the contaminants may be solids such as magnesium oxide, magnesium nitride, and silicon oxide.

In step (a) the stream may be directed at a controlled rate into the condenser apparatus. The metal vapour may be mixed with an inert gas such as argon, and with dross, i.e. solid particles such as magnesium oxide.

The metal vapour, in step (a), may have a pressure of from 0.7 to 1.2 atm.

The metal generating furnace may contain an underflow-overflow weir arrangement for continuous withdrawal of slag and residual ferrosilicon that are produced as by-products in the furnace to make the whole process of metal generation and condensation continuous.

In the case of magnesium the partial pressure of the magnesium vapour entering the condenser apparatus may be kept in the range of 0.7 to 1.2 atm. The partial pressure of the inert gas entering the condenser apparatus may be maintained in the range from 0 to 0.3 atm.

In step (b) the temperature inside the crucible may be controlled so that the vapour is condensed into liquid metal but so that the liquid metal is not allowed to solidify.

In step (c) the agitation (e.g. stirring) may be controlled so that the dross is suspended into the liquid metal to allow tapping of the mixture as a slurry. The agitation induces a uniform temperature distribution within the liquid metal bath by effectively dissipating the energy of condensation through side-walls of the crucible and into the heat transferring medium, which improves the efficiency of metal condensation.

A substantial temperature gradient may exist inside the complete furnace condenser system, including the connection between the furnace and the condenser crucible. For example, magnesium melts at a temperature of about 650° C., and is vaporised at about 1100° C. Clearly the magnesium vapour leaving the furnace has a temperature that is high enough to prevent magnesium condensation at the connection between the furnace and the inlet to the condenser apparatus. The liquid magnesium in the condenser apparatus must be maintained at a temperature in excess of 650° C., but below 1100° C., which is the boiling point of magnesium.

The temperature inside the condenser apparatus may be controlled by circulating a heat transferring medium, through one or more jackets within the condenser apparatus or by using any other heat exchange device. The heat transferring medium may be a hot gas, ambient air, steam, a liquid metal, e.g. tin or lead, or a liquid salt or mixtures of salt such as mixtures of sodium chloride, potassium chloride, and magnesium chloride.

Initially the heat transferring medium may transfer heat from an external source to the condenser apparatus but thereafter, as the temperature of the condenser apparatus rises due to the intake and condensation of the metal vapour, heat may be extracted from the condenser apparatus and the heat transferring medium may be taking heat away from the condenser apparatus.

Agitation of the crucible contents may be effected by means of a stirrer with an impeller which is designed to create a vortex in order to pull solid particles and metal vapour and liquid droplets (fog or mist) into the melt. The desired flow and mixing pattern may be enhanced by installing baffles or fins in the condenser crucible.

The liquid metal and suspended solids may be tapped from the crucible in any appropriate way on a continuous or semi-continuous basis. For example the liquid metal and suspended solids may be tapped through an outlet pipe or may be siphoned from the crucible. Salt fluxes such as sodium chloride, potassium chloride, magnesium chloride, aluminium fluoride, and cryolite may be added to the condenser to enhance magnesium tapping.

The invention also extends to a condenser apparatus for condensing metal vapour which comprises a receiving crucible, an elbow, a secondary condenser, an inlet through which metal vapour is directed through the elbow into the crucible, at least one temperature control arrangement for controlling temperatures inside the crucible, the elbow, and the secondary condenser so that the metal vapour condenses into liquid metal which is kept as liquid metal in the condenser apparatus, a mixing arrangement to suspend dross particles into liquid metal in the crucible and to dissipate energy of condensation, and an outlet through which liquid metal, mixed with dross, is drawn from the crucible.

Cleaning devices, such as plungers devices (e.g. sliding metal shafts with discs, actuated by hydraulics) may be used to keep passageways between the inlet and the outlet of the condenser apparatus open.

BRIEF DESCRIPTION OF THE DRAWING

The invention is further described by way of example with reference to the accompanying drawing which illustrates from a side and in cross section apparatus for condensing magnesium vapour according to the invention.

DESCRIPTION OF PREFERRED EMBODIMENT

The accompanying drawing illustrates a condenser apparatus 10, according to the invention, which includes a cylindrical receiver crucible 12 which is made of steel, an inlet 14 through which magnesium vapour is introduced into the condenser apparatus and a condenser top section or elbow 16 which forms a connection between a furnace (not shown) and the crucible. Magnesium vapour, introduced at the inlet 14, may be mixed with an inert gas such as argon, and may contain solid particles such as magnesium oxide. A thermally insulating refractory material 18 is included in an upper part of the elbow 16.

A steel exit pipe 20 forms a secondary magnesium condenser, which terminates in a condenser outlet 22.

Sleeves or jackets 24 and 26 extend respectively around the crucible 12 and around the secondary condenser 20. The jackets are connected to temperature controlling devices (not shown) which, in this example, are based on the use of hot gas and cooling air. The inside of the crucible 12 is maintained at an appropriate temperature for condensation of magnesium vapour as liquid magnesium by blowing a heat transferring medium which, according to requirement, is either cooling air or hot combustion gases, tangentially into an annular space 25 between the jacket 24 and the crucible. Similarly by blowing cooling air or hot gas into an annular space 27 between the pipe 20 and the jacket 26, the inside of the secondary condenser 20 is maintained at a suitable temperature for condensation of magnesium vapour as liquid magnesium. Spirals may be located in the annular spaces around the crucible 12 and the pipe 20 to reduce any possible large temperature differences in these spaces.

The temperatures inside the crucible 12 and the secondary condenser 20 are maintained at 650° C. to 750° C. by regulating the supply of propane gas to burners 28 and 30, that are positioned to heat the crucible and the secondary condenser respectively. Heat can be extracted from the crucible and the secondary condenser by blowing cooling air into the annular spaces 25 and 27 respectively, and so onto the walls of the crucible and the secondary condenser. When the flows of propane gas to the burners 28 and 30 are switched off, burner fans (not shown) can be used to blow cooling air into the annular spaces 25 and 27. The heat transferring medium exits the annular spaces via openings 32 and 34 for the crucible and the secondary condenser respectively.

The temperature control is thus effected at least by using heat exchanger principles. In this example a heat exchange device is formed by the jackets which enclose the spaces 25 and 27 through which the heat transfer medium is circulated. For a gas this can be done by using fans. When liquids are used suitable pumps are employed. Depending on circumstances liquid heat transferring mediums can be selected for example from tin, lead, sodium, potassium, and salts of sodium, potassium and magnesium, in molten form.

A lower part 36 of the elbow 16 and a roof 38 of the crucible can contain similar temperature controlling arrangements as the crucible and the secondary condenser. These components are not shown in the drawing.

The contents of the crucible are agitated by being stirred by a variable speed mixer 40 so as to suspend solid dross particles, such as magnesium oxide particles, into the liquid magnesium and, by so doing, to allow tapping of the mixture as an emulsion or slurry. An impeller 41 of the mixer is designed to create a vortex to pull magnesium vapour, liquid magnesium droplets, and solid particles of dross into the molten magnesium.

The crucible contains an underflow/overflow arrangement 43, consisting of an inclined spout 42 and an overflow box 44 with a tap hole 46, for continuous or semi-continuous tapping of the mixture of magnesium and dross. The spout 42 can also be used for siphoning liquid magnesium and dross from the crucible 12. Another tap hole 48 extends from a lower region of the crucible for draining of the magnesium-dross mixture from the crucible 12, when this is required for maintenance. The suspended solids are removed from the tapped liquid magnesium by co-melting with salt fluxes, which is known art.

The condenser apparatus is made airtight at its inlet 14 and outlet 22, at a port for the lower tap hole 48, at a connection between the crucible 12 and the elbow 16, and a connection between the crucible 12 and the secondary condenser 20, by means of high-temperature gaskets. These components are not shown for they are known in the art.

In use, a mixture of magnesium vapour, inert gas, and solid particles such as magnesium oxide, produced in a furnace, not shown, is supplied at a controlled rate to the condenser apparatus via the inlet 14. A furnace which is able to generate magnesium at atmospheric pressure, from magnesium-oxide containing feed materials, is described for example in U.S. Pat. No. 4,699,653. Slag and residual ferrosilicon produced in the furnace may be tapped from the furnace on a semi-continuous or continuous basis, by means of an underflow-overflow weir arrangement, without interrupting the magnesium generation and condensation process. The partial pressure of the magnesium, entering the condenser apparatus, is kept in the range from 0.7 to 1.2 atm, while the partial pressure, at the inlet 14, of the inert gas, which normally is argon, is kept in the range of 0 to 0.3 atm. The pressure in the condenser apparatus is atmospheric or close to atmospheric and normally is in the range of 0.7 to 1.2 atm.

The temperature of the mixture of magnesium vapour, inert gas and solid particles at the inlet 14, is above 1100° C. The gas is forced downwardly as is indicated by means of a succession of arrows 50. In a lower region of the elbow 16, and in an upper region of the crucible 12, the temperature is considerably reduced and the vapour is liquified to a large extent. The magnesium that condenses in the elbow 16 runs into the crucible.

The secondary condenser 20 is designed to recover at least part of the vapour which is not liquified. The magnesium condensed in the secondary condenser runs back into the crucible.

Liquid magnesium droplets (fog or mist), magnesium vapour, and dross (mostly magnesium oxide) are drawn into a bath 52, in the crucible, which contains mainly liquid magnesium, and the dross is suspended into the liquid magnesium. As stated, the impeller 41 is designed to create a vortex and so to pull in magnesium and dross efficiently. During operation, the magnesium bath level is kept between the bottom and an upper level of the overflow box 44. The magnesium bath level has to be contained within a narrow range for effective operation of the mixer. A number of fins or baffles (not shown), are located on an inner side of the crucible, to break up centrifugal motion that is induced in the liquid metal by the stirrer 40 and to enhance mixing.

The condensate is tapped from the magnesium tap hole 46, either continuously or intermittently, for example each time when an upper level is reached in the overflow box 44. Three plunger devices 54 (in this case: sliding metal shafts with discs, actuated hydraulically) are used for the cleaning of possible deposits in the inlet pipe 14, in the elbow, and in the secondary condenser, thereby to keep passageways in the condenser apparatus open.

The temperature of the condensed magnesium, inside the crucible, is kept at a level above the melting point of the magnesium; the interior of the condenser apparatus is maintained at, or near to, atmospheric pressure; and the dross is kept suspended in the molten magnesium. It is therefore possible to tap the condensed metal and dross 52 continuously or semi-continuously from the condenser apparatus through the tap hole 46, without interrupting metal vapour production and subsequent condensation. Internal surface areas of the crucible, the secondary condenser and the elbow are designed to provide sufficient surface area for effective condensing.

The design is such that in use of the condenser apparatus the level of the magnesium bath inside the crucible allows for efficient mixing of liquid magnesium and dross, and to effect a required degree of heat transfer from the inside of the condenser apparatus to the heat transferring medium.

EXAMPLE OF THE INVENTION

A test was conducted using condenser apparatus as shown in the drawing.

A mixture of magnesium vapour and argon gas was supplied at a controlled rate of about 75 kg/h magnesium vapour and 5 kg/h argon gas to the condenser apparatus, via the inlet 14, for a period of approximately 50 hours. The furnace used to generate the magnesium vapour at atmospheric pressure, and essentially as described in U.S. Pat. No. 4,699,653 is not shown in the drawing. The partial pressure of magnesium at the inlet, was kept at about 0.82 atm, while the partial pressure of argon, at the inlet, was kept at about 0.03 atm, taking into account that the atmospheric pressure at the location of the test was approximately 0.85 atm.

About 1200 kg of magnesium ingots were heated up and kept molten inside the crucible 12 during the starting up phase by means of the propane burner 28. This magnesium was used to bring the level of liquid magnesium inside the crucible above the level of the impeller of the stirrer 40 in order to allow stirring of the crucible contents, and up to a minimum height in the inclined spout 42 to create a seal of liquid magnesium at the inclined spout. When supplying magnesium vapour to the condenser apparatus, the temperature inside the crucible was kept in the region of 650° C. to 750° C. by controlling the temperature of the gas which was blown through the annular space 25. This was achieved by adjusting the flow of propane gas to the burner, or the volume of cooling air which was blown into the annular space 25. At a relatively low flow of magnesium vapour to the condenser apparatus, usually no cooling air was required to maintain the contents of the crucible at a temperature above 650° C., which is the melting point of magnesium, and hot combustion gases were normally blown around the crucible at controlled rates.

Temperatures were measured inside the crucible and at its side-walls, at different positions, by means of thermocouples. A substantially uniform temperature distribution was maintained throughout the crucible and its side-walls, with maximum measured temperature differences being 10° C. This results mainly from the design of the impeller 41, and the operation of the stirrer.

The temperature of the secondary condenser 20 was maintained at between 650° C. and 700° C., by using hot gas or cooling air through the space 27, in the same way as temperature control inside the crucible was achieved.

The rotational speed of the stirrer 40 was variable between 40 rpm and 140 rpm and the stirrer was usually operated at 60 rpm to 80 rpm to achieve efficient mixing of the crucible contents, to enhance condensation by pulling in magnesium vapour and droplets, and to dissipate energy of condensation through the crucible side-walls.

Liquid magnesium and suspended solids (dross of mainly magnesium oxide particles) were tapped periodically from the crucible via the tap hole 46. During the 50 hours that magnesium vapour was supplied to the crucible, about 3500 kg crude magnesium, i.e. magnesium with 3 to 8 percent (mass %) suspended dross particles, was tapped from the crucible. The efficiency of magnesium condensation was about 85 percent. The efficiency of magnesium condensation is calculated as follows: mass of magnesium metal tapped from the crucible as a fraction of the mass of magnesium in the gas leaving the furnace; mass of magnesium in the gas leaving the furnace being the mass of magnesium in the feed to the furnace minus the mass of magnesium in the slag tapped from the furnace. In an earlier test using an apparatus similar to the apparatus 10 but without using a stirrer, the efficiency of magnesium condensation was only about 75 percent. The plunger devices 54, actuated by hydraulics, were used as required to keep the passageways between the inlet and the outlet of the condenser apparatus open.

The facility provided by the present invention of being able to tap liquid magnesium continuously or semi-continuously from the crucible, without interrupting metal vapour production, should be contrasted with the situation which prevails in a conventional Magnetherm process wherein the magnesium vapour is condensed mainly as solid magnesium. In that process when the condenser crucible is filled with magnesium, the magnesium generating process is stopped, the vacuum is broken, the full crucible is removed, and an empty crucible is connected to the magnesium generating furnace. Downtimes of more than 20% of the total operating time are experienced in the Magnetherm process mainly due to the batch-wise operation of the condenser.

The invention claimed is:

1. A method for continuously condensing metal vapour which includes a receiving crucible and which includes the steps of:
    directing a stream of metal vapour containing solid particles of dross at, or close to, atmospheric pressure into a sealed condenser apparatus which includes a receiving crucible, and
    controlling the temperature inside the receiving crucible so that the metal vapour condenses and is kept as liquid metal in the crucible and which includes the steps of:
    mixing the crucible contents of liquid metal and dross in order to suspend the dross into the liquid metal thereby forming a slurry; and
    tapping the slurry of liquid metal and dross from the crucible, without interrupting the production of metal.

2. A method according to claim 1 wherein the metal vapour is selected from magnesium, zinc, calcium, sodium, potassium, and phosphorus vapour.

3. A method according to claim 2 wherein the metal vapour is mixed with an inert gas.

4. A method according to claim 3 wherein the dross comprises solid particles of mainly metal oxides.

5. A method according to claim 1 wherein the metal vapour is mixed with an inert gas.

6. A method according to claim 1 wherein the dross comprises solid particles of mainly metal oxides.

7. A method according to claim 1 wherein liquid metal and suspended dross are tapped from the crucible on a continuous or semi-continuous basis.

* * * * *